US009770663B2

(12) United States Patent
Wilkins

(10) Patent No.: US 9,770,663 B2
(45) Date of Patent: Sep. 26, 2017

(54) COMPUTERIZED CAR RACING GAME SYSTEM

(71) Applicant: James Curtis Wilkins, Lanham, MD (US)

(72) Inventor: James Curtis Wilkins, Lanham, MD (US)

( * ) Notice: Subject to any disclaimer, the term of this patent is extended or adjusted under 35 U.S.C. 154(b) by 322 days.

(21) Appl. No.: 14/667,271

(22) Filed: Mar. 24, 2015

(65) Prior Publication Data
US 2016/0279525 A1 Sep. 29, 2016

Related U.S. Application Data

(60) Provisional application No. 61/969,793, filed on Mar. 24, 2014.

(51) Int. Cl.
| | |
|---|---|
| *A63F 13/803* | (2014.01) |
| *A63F 13/2145* | (2014.01) |
| *A63F 13/65* | (2014.01) |
| *A63F 13/63* | (2014.01) |
| *A63F 9/14* | (2006.01) |
| *A63H 18/08* | (2006.01) |
| *A63H 18/12* | (2006.01) |
| *A63H 18/16* | (2006.01) |
| *A63F 13/46* | (2014.01) |

(52) U.S. Cl.
CPC ............ *A63F 13/803* (2014.09); *A63F 9/143* (2013.01); *A63F 13/2145* (2014.09); *A63F 13/63* (2014.09); *A63F 13/65* (2014.09); *A63H 18/08* (2013.01); *A63H 18/12* (2013.01); *A63H 18/16* (2013.01); *A63F 13/46* (2014.09)

(58) Field of Classification Search
CPC ...................................................... A63F 13/803
USPC ................................................ 463/6, 7, 9, 10
See application file for complete search history.

(56) References Cited

U.S. PATENT DOCUMENTS

| | | | | |
|---|---|---|---|---|
| 5,664,998 A | * | 9/1997 | Seelig | G07F 17/3211 273/143 R |
| 6,461,238 B1 | * | 10/2002 | Rehkemper | A63F 13/08 273/442 |
| 6,716,103 B1 | * | 4/2004 | Eck | A63F 13/23 463/40 |

(Continued)

FOREIGN PATENT DOCUMENTS

| | | |
|---|---|---|
| DE | WO0200318 A1 | 1/2002 |
| KR | 20110139823 A | 12/2011 |

(Continued)

*Primary Examiner* — Dmitry Suhol
*Assistant Examiner* — Brandon Gray
(74) *Attorney, Agent, or Firm* — The Law Firm of Andrea Hence Evans, LLC

(57) ABSTRACT

The invention features a computerized racing system designed to allow its users to engage in the sport of car racing, such as racing in full measure. System 100 features a race track connected to a computer games console that incorporates software that allows users to engage in video style racing on the race track. Virtual cars are built virtually allowing the user to customize the car and its performance features having assigned performance codes. The performance codes are sent from the race track to an actual race car when the actual race car contacts the track. The actual race car performs based on the customized performance features selected by the user.

11 Claims, 16 Drawing Sheets

(56) References Cited

U.S. PATENT DOCUMENTS

| | | | |
|---|---|---|---|
| 7,303,459 B2* | 12/2007 | Yamaguchi | A63H 30/04 446/454 |
| 2003/0153374 A1 | 8/2003 | Gilmore | |
| 2004/0266506 A1 | 12/2004 | Herbrich et al. | |
| 2005/0215327 A1* | 9/2005 | Weisel, Jr. | A63H 18/16 463/58 |
| 2007/0287537 A1 | 12/2007 | Yu | |

FOREIGN PATENT DOCUMENTS

| | | |
|---|---|---|
| NL | 2007183 | 1/2013 |
| WO | WO 0016869 A1 | 7/2004 |
| WO | WO 2005105246 A1 | 11/2005 |

\* cited by examiner

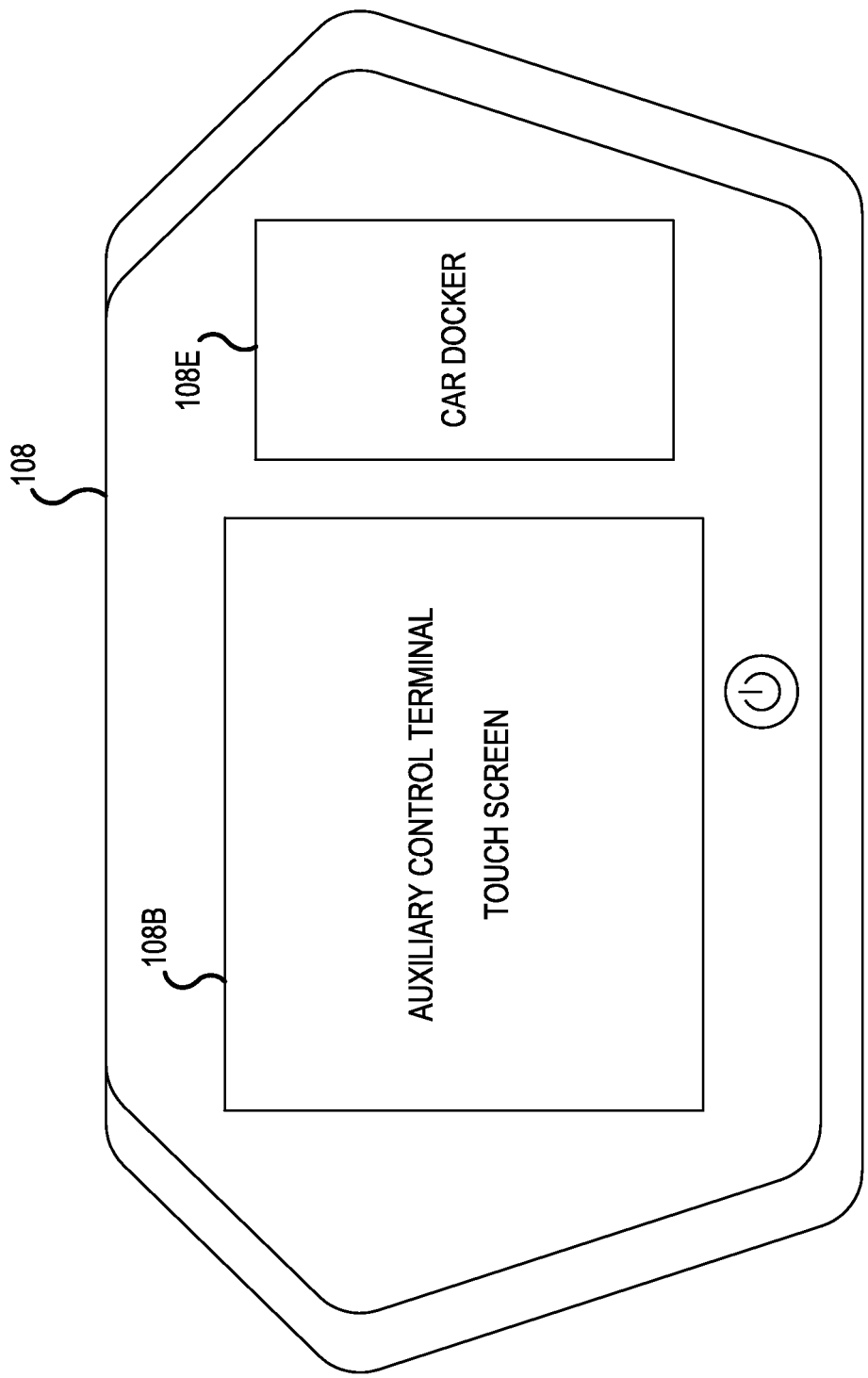

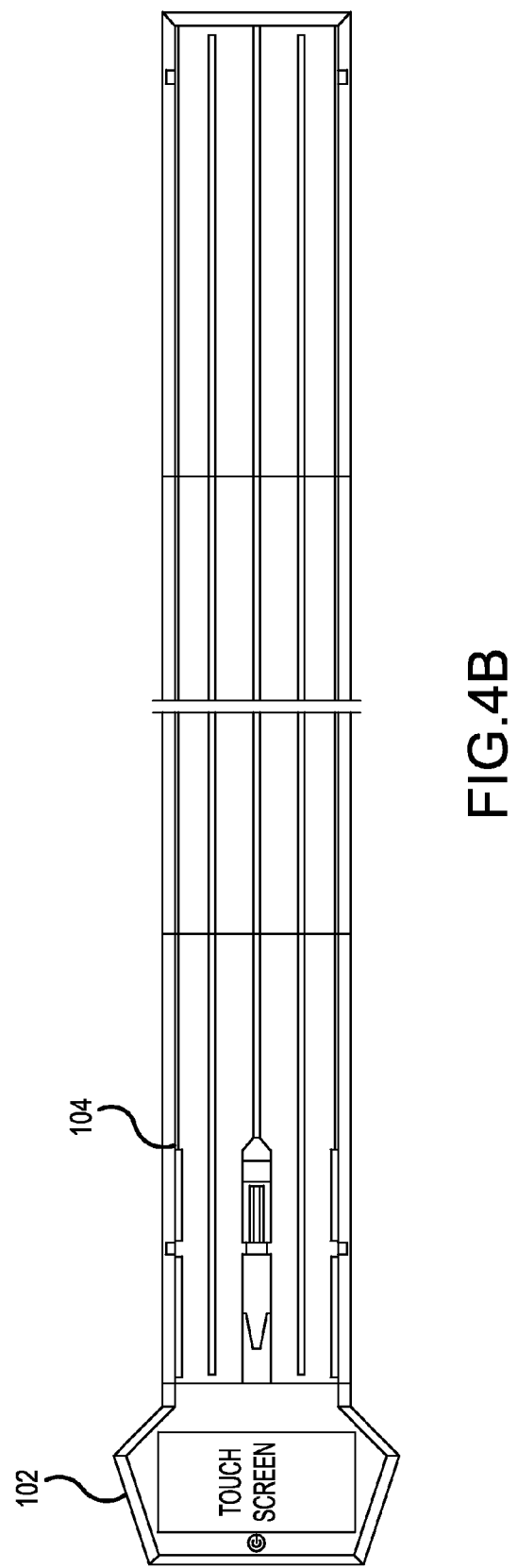

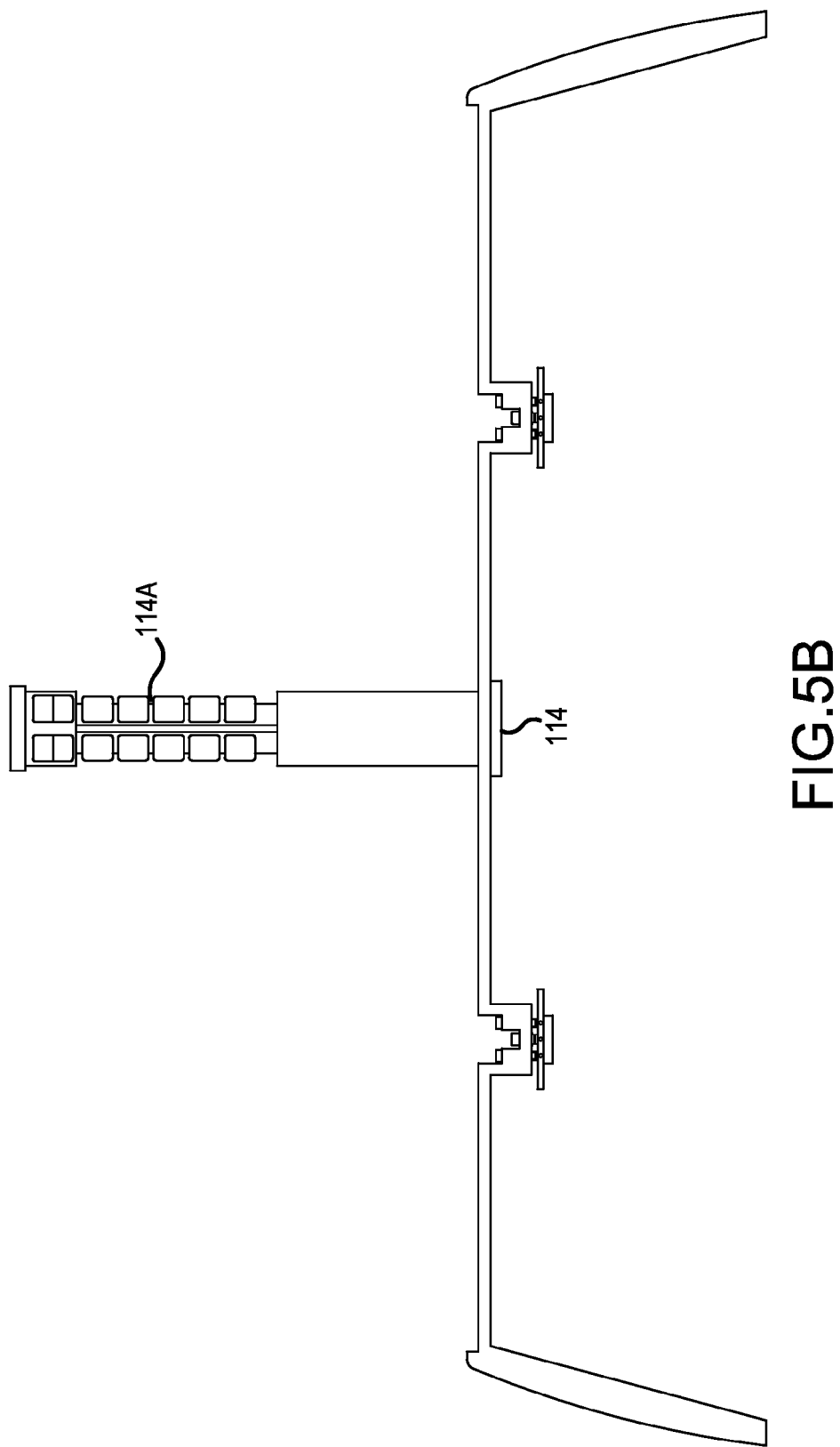

COMPUTERIZED CAR RACING GAME SYSTEM

PRIORITY CLAIM

This application is a Non-Provisional patent application claiming priority under 35 U.S.C. §119(e) to U.S. Provisional Patent Application Ser. No. 61/969,793 titled "Computerized Car Racing Game System" filed Mar. 24, 2014, the entire disclosure of which is incorporated by reference as if fully stated herein.

FIELD OF THE INVENTION

The present invention relates, in general, to a car racing game system having a game console that incorporates software that enables its users to customize a car/vehicle electronically and then race an actual car on a physical race track where the customization has been converted into electrical impulses which manifest the performance of the vehicle(s) on the physical race track.

BACKGROUND OF THE INVENTION

Video games cause players to have a sense of joy and excitement. The exhilarated feeling one experiences while playing car games is found to relieve stress and leave the player in a happy mood. Playing video games improve the user's ability to make on-the-spot decisions. The games require precise movements of hands, concentration and determination to win. Car racing games typically do not allow the players to learn about the car components and their effect on an actual race. Most racing games do not feature a hands-on educational component and the games are played in a make-believe environment.

SUMMARY OF THE INVENTION

In light of the shortcoming of other racing games, the present invention provides a computerized car racing system having state-of-the-art virtual car building software that provides on-screen car building animations and race data displays that allow a user to customize an on-screen virtual race car. The system features a race car or racing vehicle which can receive the customization data and perform on a race track based on the customization data selected by the user.

An aspect of an embodiment of the invention allows players to virtually build their race cars such that the race cars/racing vehicle are designed by the player and performance codes are assigned to the car's performance features.

A further aspect of an embodiment of the invention features the performance codes being sent through the race track whereby the race car contacts the track and the track controls the performance of the car.

A further aspect of an embodiment of the invention features physical toy race cars attached to a race track where they receive a signal to perform based on the design of the player.

A further aspect of an embodiment of the invention features a remote which is used to stage the car to simulate an actual race such as racing where the car's tires are burned (e.g. drag racing).

An aspect of an embodiment of the present invention contemplates a computerized car racing game system which may include a computer control terminal, an auxiliary control terminal, in communication with the computer control terminal. In one aspect of an embodiment of the present invention, the auxiliary control terminal may be configured to enable users to build computer models of real world racing vehicles. Such computer models are then converted by the auxiliary control terminal into performance codes. The car racing game system may also include a racing track, having left and right lanes, each lane being in communication with the computer control terminal, racing vehicle(s), with each car being adapted to run along either lane of the racing track, two or more controllers in communication with the computer control terminal, with each controller being configured to control the racing vehicle(s), and a speaker unit in communication with the computer control terminal, the speaker unit being configured to replicate real world racing sounds.

In an aspect of an embodiment of the present invention, the computer control terminal may be configured to receive the performance codes from the auxiliary control terminal and convert the performance codes into electrical pulses which are subsequently transmitted to the racing track.

In an aspect of an embodiment of the present invention, the racing vehicle(s)(s) may include a motor, a contact point, and a staging & timing sensor.

In an aspect of an embodiment of the present invention, each of the left and right lanes of the racing track may further include power rails, staging and timing sensor(s) and printed circuit board(s).

In an aspect of an embodiment of the present invention, the power rails may be responsible for supplying power and electrical impulses from the computer control terminal to the racing track, while the staging and timing sensor(s) may be responsible for staging the racing vehicle(s) for racing, starting the race and timing the racing vehicle's run down the racing track.

In an aspect of an embodiment of the present invention, the printed circuit board(s) may be in communication with the computer control terminal and may be structurally configured to connect the power rails to the computer control terminal by way of printed circuit board connecting point(s).

In an aspect of an embodiment of the present invention, the computer control terminal may include a processor, a track speed control module, a staging & timing system module, a wireless communicator module, a touch screen, and an input/output touch screen module.

In one aspect, the processor may be responsible for control, monitoring and processing of all operations of the car racing game system and for converting the performance codes received from the auxiliary control terminal into electrical pulses while the track speed control module may be configured to monitor and control the racing vehicle(s)'s speed along each lane of the racing track.

In an aspect of an embodiment of the present invention, the staging & timing system module may be configured to monitor and control all staging and timing operations of the car racing game system while the wireless communicator module enables wireless communication between the computer control terminal and other components of the car racing game system.

In an aspect of an embodiment of the present invention, the touch screen enables user input into the car racing game system while the input/output touch screen module may be configured to process user input and provide output regarding the car racing game system.

In an aspect of an embodiment of the present invention, the auxiliary control terminal may include a car performance calculator module, a processor, a wireless communicator module, a touch screen, and an input/output touch screen module.

The car performance calculator module of the auxiliary control terminal may be configured to enable users to build the computer models of real world racing vehicles while the processor may be configured for control, monitoring and processing of all operations of auxiliary control terminal and for converting the built computer models into performance codes sent to the computer control terminal.

In an aspect of an embodiment of the present invention, the wireless communicator module of the auxiliary control terminal may be configured to enable wireless communication between the auxiliary control terminal and one or more other component(s) of the car racing game system.

In an aspect of an embodiment of the present invention, the auxiliary control terminal's touch screen may be configured to enable user input to the auxiliary control terminal while the input/output touch screen module may be enabled to process user input to the auxiliary control terminal and provide output regarding the auxiliary control terminal.

In an aspect of an embodiment of the present invention, the car racing game system may also include a race track lighting component in communication with the computer control terminal. In one aspect of an embodiment of the present invention, the race track lighting component may include a set of lights configured to stage and start the race. It may also include a processor for sequencing operation of the set of lights and for facilitating communication between the race track lighting component and the computer control terminal.

In an aspect of an embodiment of the present invention, the car racing game system may also include race finish sensor(s) located along the racing track and in communication with the computer control terminal. In an aspect, the race finish sensor(s) may be configured to facilitate the computer control terminal in its functions of: pre-race actions, staging the racing vehicle(s) for racing, starting the race, and timing the racing vehicle(s) as they run down the racing track.

In an aspect of an embodiment of the present invention, the car racing game system may also include time & speed score board(s) in communication with the computer control terminal. In one aspect, the time & speed score board(s) may be configured to display racing times and speeds of the racing vehicle(s).

In an aspect of an embodiment of the present invention, the car racing game system may also include staging & timing module(s) with each being located on the underside of the racing track's lanes and in communication with the computer control terminal. The staging & timing module(s) translate(s) the racing vehicle(s) positions between a race starting point along the racing track, back to the computer control terminal.

In an aspect of an embodiment of the present invention, the car racing game system may also include race finish module(s) located on the underside of the racing track's lanes and in communication with the computer control terminal. In one aspect, the race finish module(s) translate(s) the racing vehicle(s) from a race end point along the racing track back to the computer control terminal.

Another aspect of an embodiment of the present invention contemplates a computer program product which may include a computer usable medium having control logic stored on it for causing computer processor(s) to operate a car racing game system and where the control logic may include computer readable program code for: enabling input of computer models of real world racing vehicles, converting the computer models of real world racing vehicles into performance codes, converting the performance codes into electrical pulses, tracking location(s) of the racing vehicle(s) on the racing track and determining race results based on the location(s) of the racing vehicle(s).

In another aspect of an embodiment of the present invention, the computer program product may include computer readable program code for modifying the operational features of the racing vehicle(s).

In another aspect of an embodiment of the present invention, the computer program product may include computer readable program code for determining and posting post-race results for the racing vehicle(s).

In another aspect of an embodiment of the present invention, the computer program product may include computer readable program code for monitoring a drag race of the racing vehicle(s).

In another aspect of an embodiment of the present invention, the computer program product may include computer readable program code for collecting data during a drag race of the racing vehicle(s).

In another aspect of an embodiment of the present invention, the computer program product may include computer readable program code for analyzing the data collected during the drag race.

In another aspect of an embodiment of the present invention, the computer program product may include computer readable program code for making result determinations based on the analyzed data collected.

A further aspect of an embodiment of the present invention contemplates a method of using computer processor(s) to run a car racing game system, where the method may include the steps of: enabling input of computer models of real world racing vehicles into computer processor(s), converting the computer models of real world racing vehicles into performance codes, converting the performance codes into electrical pulses, tracking location(s) of racing vehicle(s) on a racing track and determining race results based on the location(s) of the racing vehicle(s).

In a further aspect of an embodiment of the present invention, the method may include the step of modifying the racing vehicle(s)'s operational features.

In a further aspect of an embodiment of the present invention, the method may include the step of determining and posting post-race results for the racing vehicle(s).

In a further aspect of an embodiment of the present invention, the method may include the step of monitoring a drag race of the racing vehicle(s).

In a further aspect of an embodiment of the present invention, the method may include the step of collecting data during a drag race of the racing vehicle(s).

In a further aspect of an embodiment of the present invention, the method may include the step of analyzing the data collected during the drag race.

In a further aspect of an embodiment of the present invention, the method may include the step of making result determinations based on the analyzed data collected.

One object of the computerized drag race gaming system is to build a racing vehicle that will traverse the track from start to finish, against time and opponent, with the fastest time. The fastest time will be between 3.5 to 10 seconds. The vehicles with the fastest times avoid elimination and move on to the next round of racing, until a final winner is determined. Another object of the contemplated track Racing System is to select a car and race it a specified number of laps around the track, from start to finish, against time and opponent, to determine a winner.

Another objective of the computerized drag race gaming system is for a user to select a racing vehicle and race it against an opponent a specified number of laps to determine a winner.

During the course of the game, as users/operators operate their vehicles, they will execute many actions that will impact the outcome of the race. All that they do as vehicle operators will have strategic bearings on their winning or losing the game.

Additional aspects, objectives, features and advantages of the present invention will become apparent from the following description of the preferred embodiments with reference to the attached drawings.

BRIEF DESCRIPTION OF THE DRAWINGS

FIG. 3B illustrates an exemplary top view of an auxiliary control terminal, according to an aspect of an embodiment of the present invention.

FIGS. 4A & 4B illustrate exemplary plan views of a racing track, according to aspects of embodiments of the present invention.

FIGS. 5A through 5G illustrate additional exemplary details of a racing track and racing track components, according to aspects of embodiments of the present invention.

DETAILED DESCRIPTION OF THE INVENTION

Figure 1:
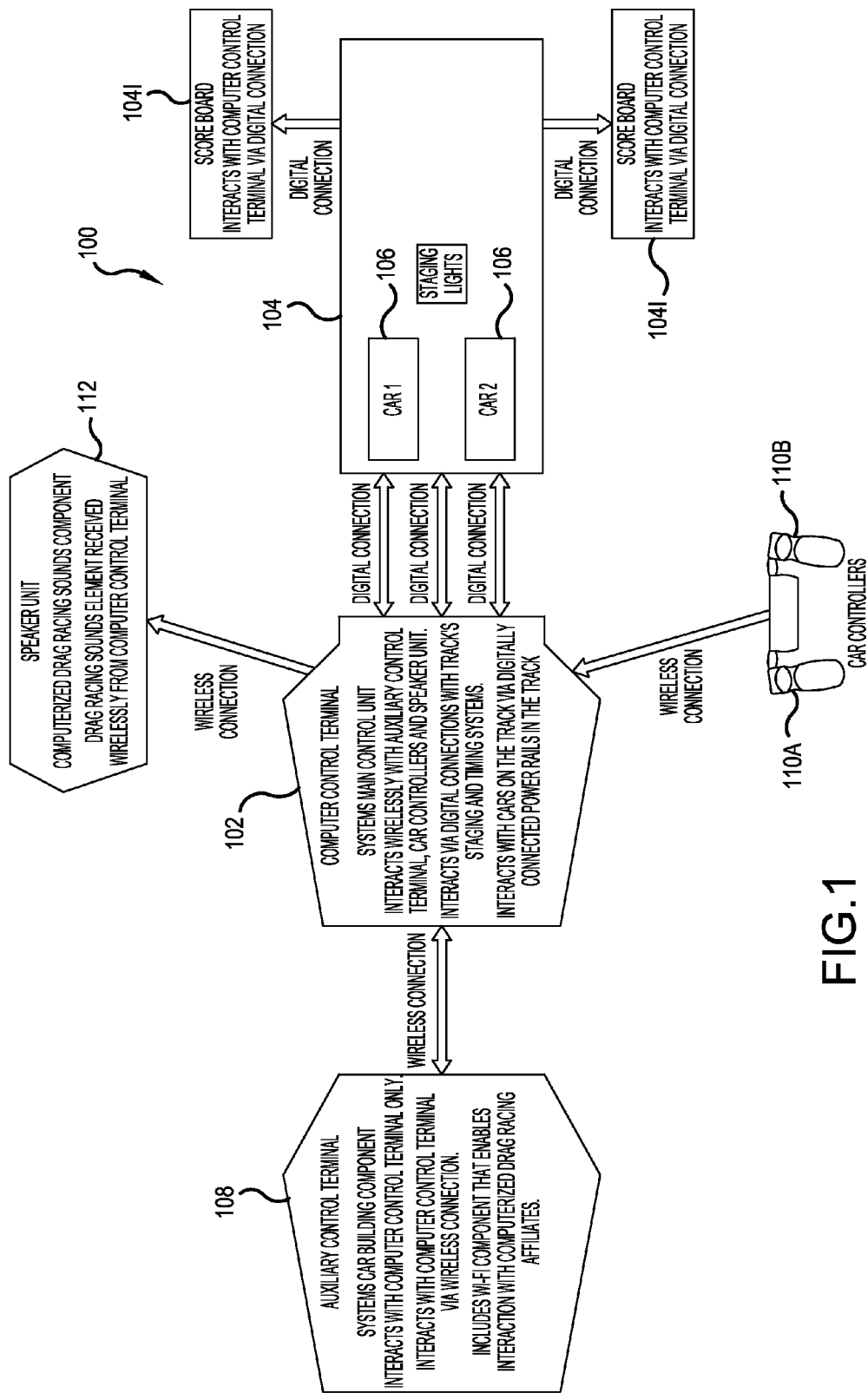
FIG. 1 illustrates an exemplary system diagram of a car racing game system according to an aspect of an embodiment of the present invention.

Referring now to FIG. 1 a system diagram of car racing game system 100 according to an aspect of an embodiment of the present invention, is shown. System 100 features six components that interact to provide a complete racing experience on the race track designed to look and perform like a real world racing track. The six components may interconnect wirelessly or by means of digital connectors to provide a seamless flow of commands, signals, data and sounds that will produce a unique and fun gaming experience. The six components are: computer control terminal 102, auxiliary control terminal 108, racing track 104, racing vehicle(s) 106, at least two vehicle controllers 110A & 110B, and speaker unit 112. The interaction between some or all of these components enables users of system 100 to engage in the following actions, among others, that make-up the sport of racing: build racing vehicles, burnouts, stage their vehicles to race, control their vehicles' actions down the track, get race results at the end of the race and rebuild their vehicles for the next round. Interaction between the various components of system 100 (along with performance code execution and conversion) also enable users to engage in additional actions, including enabling users to: select race cars, modify and tune cars to race conditions (engine modification, tire selection, etc.), select virtual pit crews (pit crew selection determines proficiency of pit action), run qualification laps to determine lane assignment, simulate official engine starting ("ladies and gentlemen start your engines"), relinquish control of car to computer control terminal during pace and caution laps, control the performance of the cars during green flag racing laps, simulate pit stops to: refuel, change tires, adjust mechanics of cars, etc.

Figure 2A:
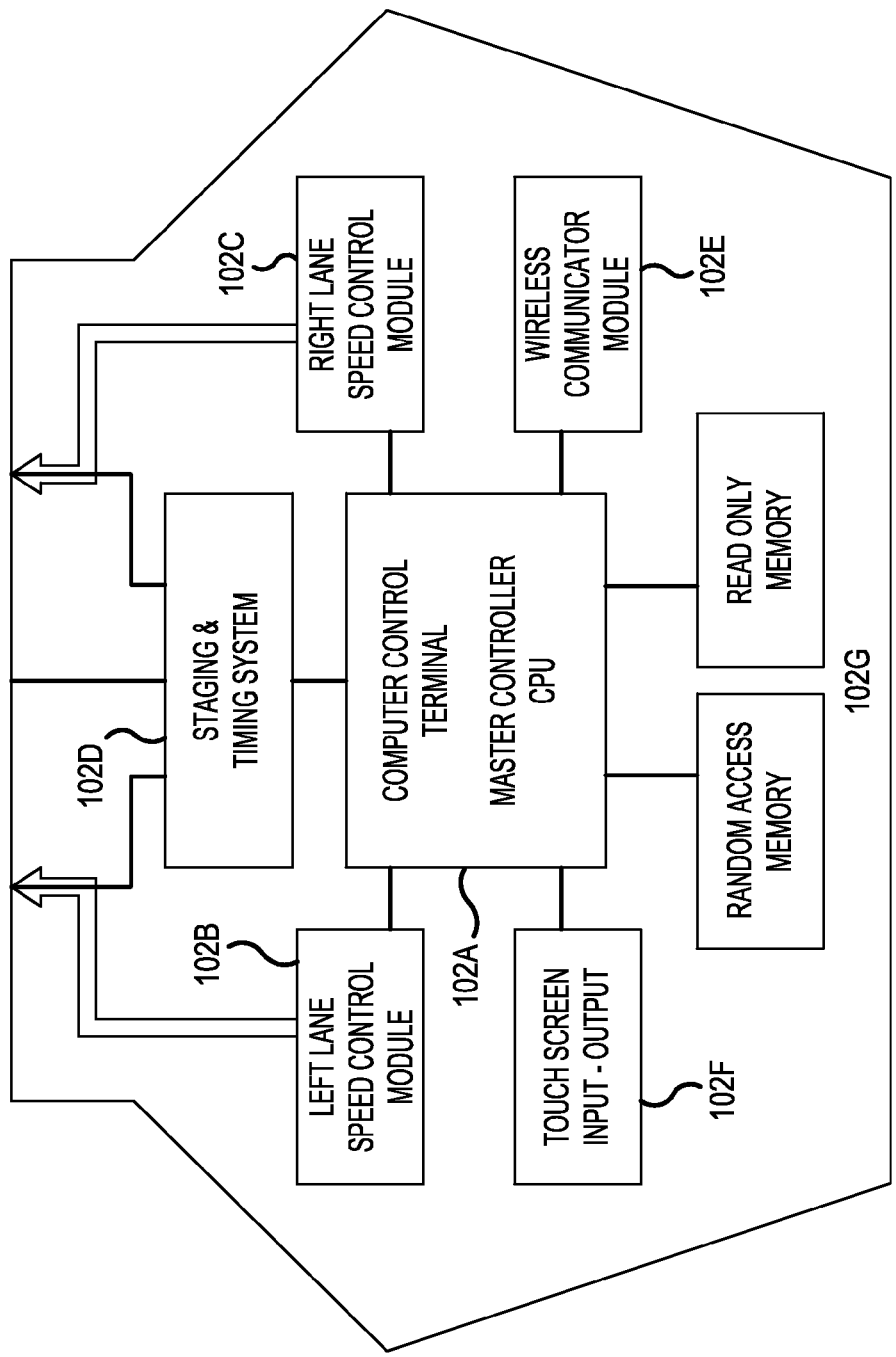
FIG. 2A illustrates an exemplary block diagram of a computer control terminal, according to an aspect of an embodiment of the present invention.
Figure 2B:
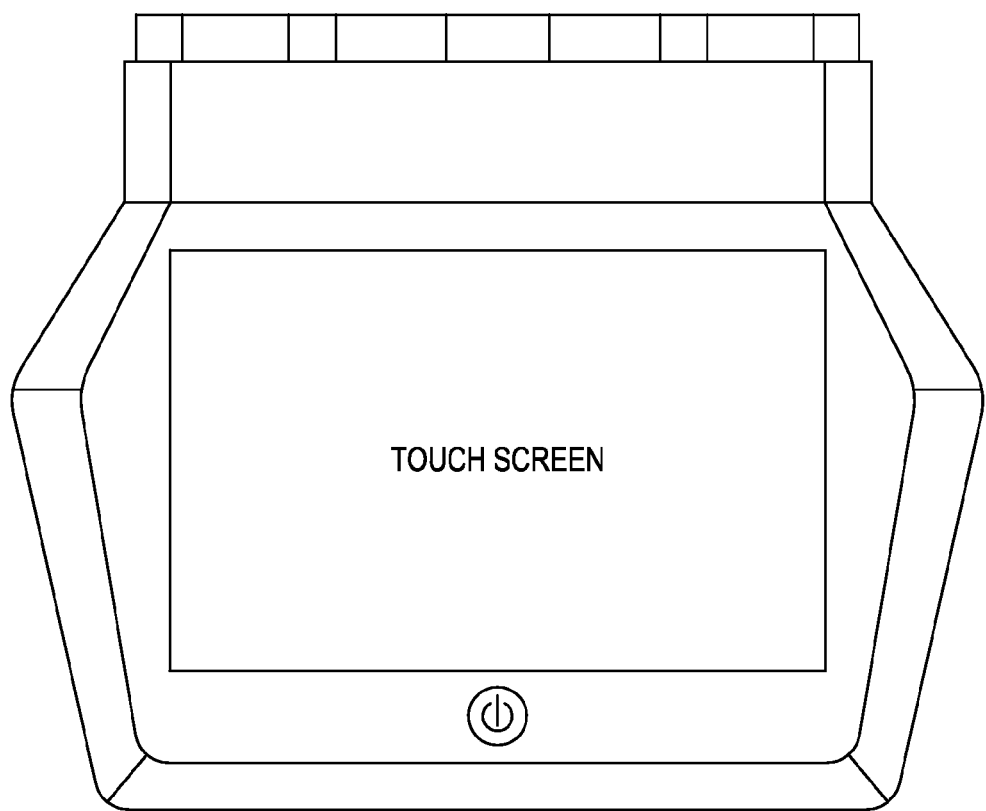
FIG. 2B illustrates an exemplary top view of a computer control terminal, according to an aspect of an embodiment of the present invention.

Referring now to FIGS. 2A & 2B a block diagram and a top view of the computer control terminal 102, according to aspect(s) of embodiment(s) of the present invention are both shown. Computer control terminal 102 is the central controlling unit of the computerized racing system 100. It is the unit that interacts with the track, and vehicles on the track, to provide a video game like experience. It is the only component that interacts with all five other components of system 100. Computer control terminal 102's key features include microprocessor 102A, left lane speed control module 102B, right lane speed control module 102C, staging & timing system module 102D, wireless communicator module 102E, input/output touch screen 102F, memory 102G and state-of-the-art gaming software 102H (not shown). In one aspect of an embodiment of the present invention, computer control terminal 102 may also include car dock 102I where the racing vehicles may dock before and after racing. Computer control terminal 102 may be configured to provide a video game like experience on a physical track. Computer control terminal 102 automatically turns on and off other system components, including auxiliary control terminal 108, car controllers 110A & 110B and speaker unit 112. Computer control terminal 102 receives the virtually built cars performance codes from auxiliary control terminal 108 and converts them to electrical impulses which are then sent to the power rails on the tracks. Computer control terminal 102 also conducts additional functions such as receiving data from in-track sensors that track the vehicle's location at select positions such as staged, starting and finishing points of the race, processing data received from in-track sensors to determine race results, displaying race results on touch screen 102F and score boards 104I, etc. All data can be stored in computer control terminal 102 for future reference. Computer control terminal 102 may also be configured, in one aspect of an embodiment of the present invention, enable the racing vehicles to race a specified number of laps under green and yellow flags to complete a race, and end the race at the checkered flag and get the race results.

Figure 3A:
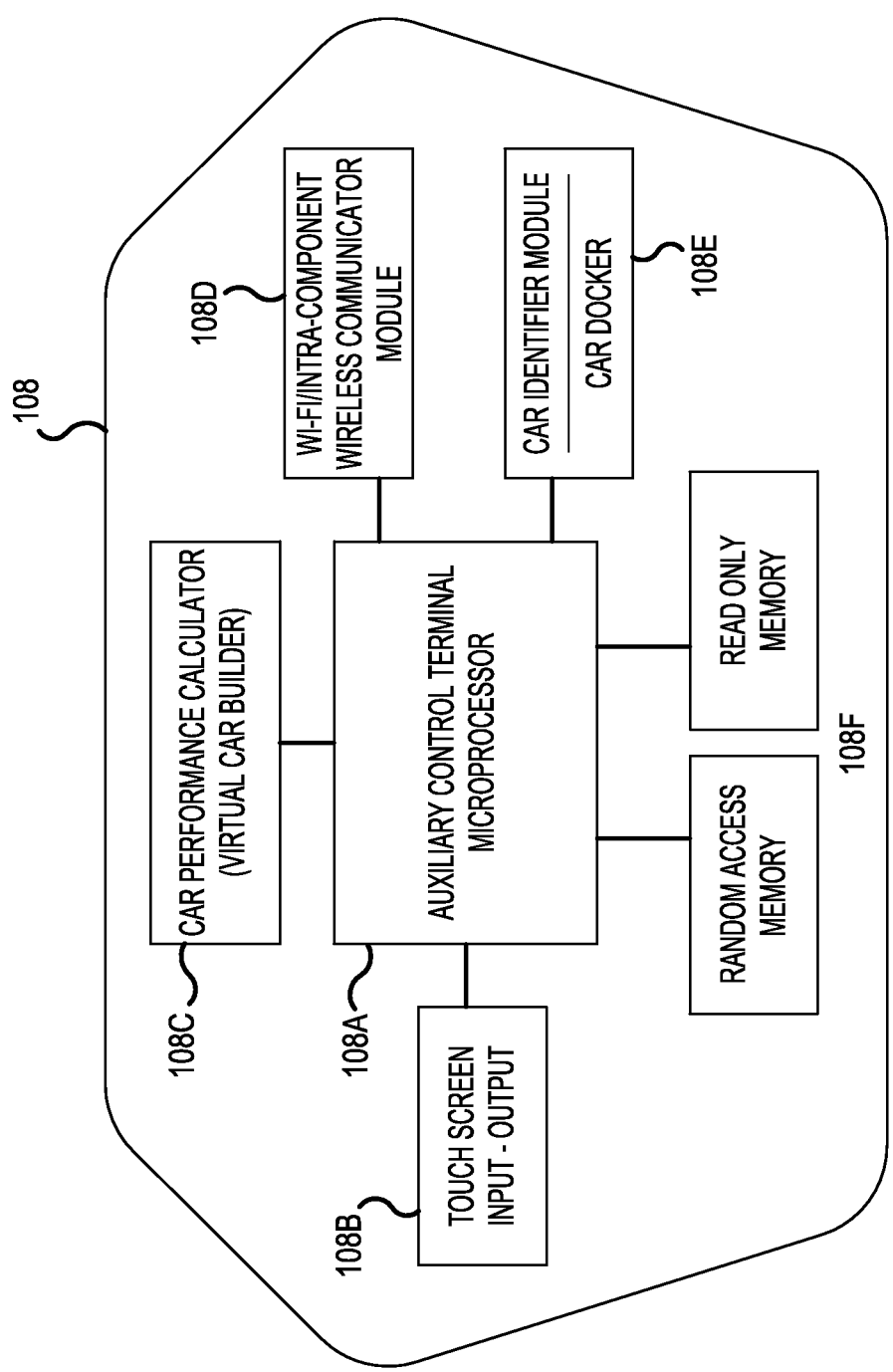
FIG. 3A illustrates an exemplary block diagram of an auxiliary control terminal, according to an aspect of an embodiment of the present invention.

Referring now to FIGS. 3A & 3B a block diagram and the top view of auxiliary control terminal 108, according to aspect(s) of embodiment(s) of the present invention are shown. Auxiliary control terminal 108 is the component of system 100 that enables users to custom "build" the racing vehicles. User input into auxiliary control terminal 108 for such customization will determine the performance of the vehicles on the physical track. Auxiliary control terminal 108 features processor 108A, input/output touch screen 108B for touch activated car building animations, display, data display, and race related animations and videos. Auxiliary control terminal 108 may also include car performance calculator module 108C, wi-Fi/Intra-component wireless communicator module 108D for enabling wireless communication between auxiliary control terminal 108 and other components of system 100, car identifier module 108E for identifying each racing vehicle and memory 108F.

Auxiliary control terminal 108 is a wireless unit that interacts only with computer control terminal 102. It also includes a Wi-Fi component that will allow it to interact with internet based computerized racing activities. Car performance calculator module 108C of auxiliary control terminal 108 is system 100's component where users will build virtual vehicles that determine the performance of the actual vehicles on the track. Users can also modify or rebuild their virtual vehicles between rounds at auxiliary control terminal 108, with the objective of improving the performance of their vehicle in the next round. The basic racing game format consists of an event that includes a series of rounds to determine a final winner. Auxiliary control terminal 108 will feature vehicle building software that will allow users to build computer models of real world racing vehicles. These computer models will be processed into performance codes that will be sent wirelessly to computer control terminal 102 (game console).

Car performance calculator module 108C may feature vehicle building software that enables users to build computer models of real world racing vehicles. These computer models are then converted to performance codes that are sent wirelessly to computer control terminal 102. Computer control terminal 102, upon receipt, will convert the performance codes into electrical impulse signals that determine the performance of the vehicles on the track. Specifically, computer control terminal 102 sends the signals to the power rails in the track. This sequence of actions from auxiliary control terminal 108 to the signals in the power rails will determine the times that the vehicles travel down the track during a race. The signals will also determine how the car performs on the track during the race. For example, if a user selects a car with a better tires, the user's car may perform faster than the competitor's car. The user will mix and match performance features to create an ideal race car. The user will use auxiliary control terminal 108 to build the car by selecting the car's performance features which may include, without limitation: torque, horsepower, turbochargers, and tires, for example. Each performance feature has a performance code. The actual race car will receive the performance code signal from the track with the customized performance features selected by the user and perform in the race based on the customized performance features selected by the user. Auxiliary control terminal 108 may feature a USB port for flash drive downloads to download the custom performance features from web based entities to the race car.

In aspects of embodiments of the present invention each of, or all of the various touch screens of system 100 may be configured to enable users to: modify and tune cars to race conditions (engine modification, tire selection, etc.), start the racing vehicle engines (includes starting and other switches at engine starting screen), display racing vehicle instrument gauges (to monitor car's performance during the race), receive crew chief messages during the race, and select pit stop options (fuel, tires, etc.).

Figure 4A:
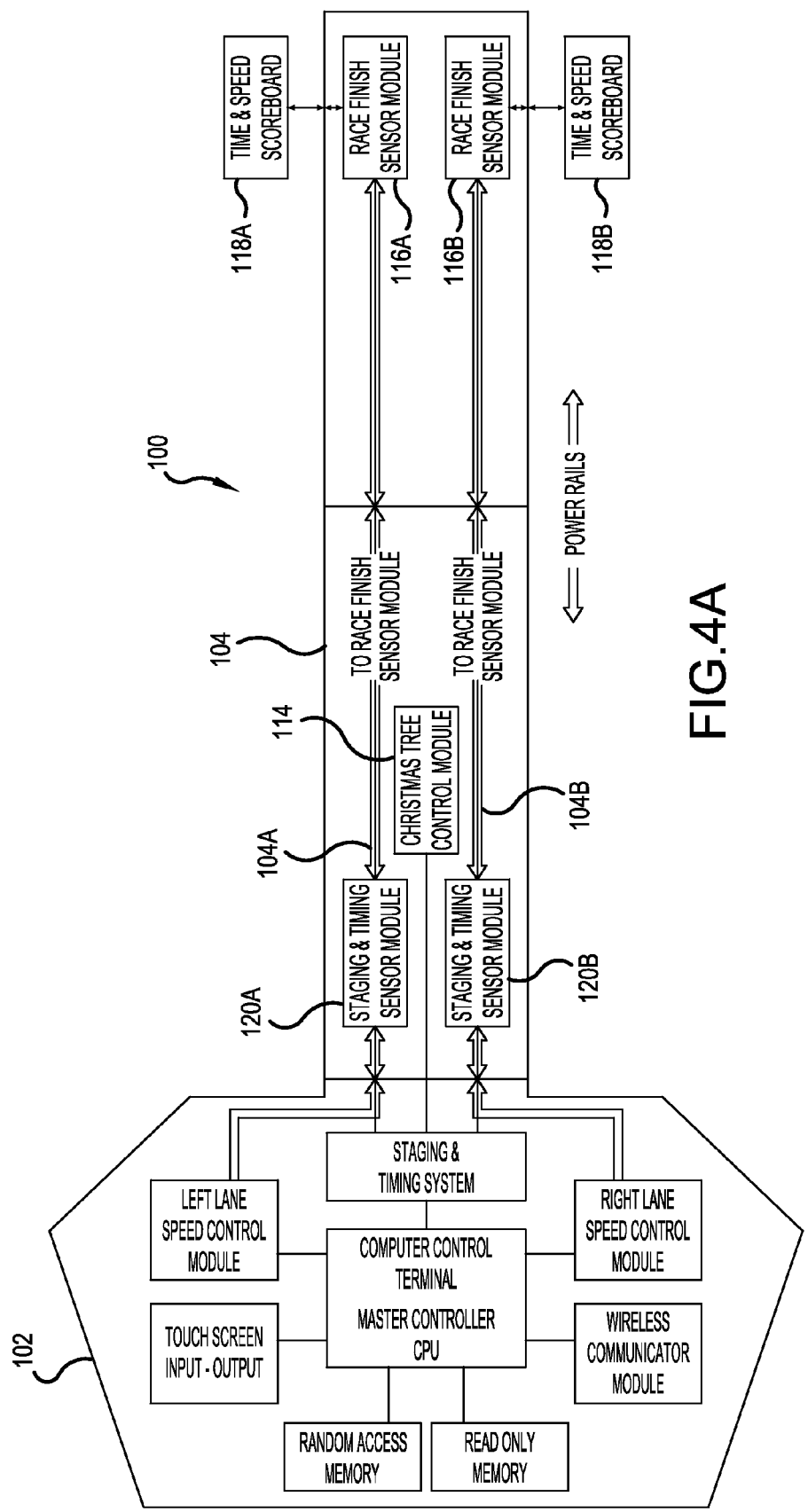

Referring now to FIGS. 4A & 4B plan views of racing track 104, according to aspect(s) of embodiment(s) of the present invention are shown. Here, computer control terminal 102 is shown being connected to racing track 104. In one aspect of an embodiment of the present invention, computer control terminal 102 may be digitally connected to racing track 104. Racing track 104 is shown having a left lane racing track 104A and a right lane racing track 104B. Also shown is left lane staging & timing sensor module 120A and right lane staging & timing sensor module 120B. The staging & timing sensor modules 120A and 120B are modules having in-track sensors that facilitate computer control terminal 102 in its functions of: pre-race actions, staging the cars for racing, starting the race, and timing each racing vehicle 106's run down the track. In particular, staging & timing sensor modules 120A and 120B are modules tasked with translating the racing vehicle 106 from the race starting point back to the computer control terminal 102. Also shown are left lane race finish sensor module 116A and right lane race finish sensor module 116B—which translate racing vehicle 106 along the full length of racing track 104, on each respective lane, back to computer control terminal 102. These also assist computer control terminal 102 in its functions of: starting the race, and timing racing vehicle 106's run down the track.

In one aspect of an embodiment of the present invention, racing track 104 may be connected directly, as shown, to computer control terminal 102, making its functionality fully computerized. Racing track 104 is where the racing race with the physical customized racing vehicle 106 takes place. It may include at least two lanes, left lane racing track 104A and a right lane racing track 104B, as previously mentioned above, with each lane aligned to the left and right of each other, where racing vehicles 106 are placed for racing. Racing track 104 may be designed in a variety of lengths and widths. In one aspect of an embodiment of the present invention, racing track 104 may be twelve feet long and seven inches wide, with a negative two degree decline from computer control terminal 102 to its end. It may be configured to give it the appearance of a real world racing track.

In one aspect of an embodiment of the present invention, the track, as designed, may be oval in shape, and may cover an area that is eight feet long and four feet wide, and may feature a racing surface that is seven inches wide. The track's surface banks at angles of three degrees along the front straight, zero degrees along the back straight, and fifteen degrees around the turns. It may also be configured to give it the appearance of a real world NASCAR® track.

In another aspect of an embodiment of the present invention racing track 104 may also include a pit area (not shown) where racing vehicles 106 may park to simulate pit servicing of the vehicles. In one aspect of an embodiment of the present invention, racing track 104 may also include pit road graphics and color schemes including pre-racing starting position at the pit area on the track as the position to place the car to begin the race.

In an aspect of an embodiment of the present invention, system 100 may also include on-screen animations of waving green flags (to start and restart the race), yellow flags (to signal caution laps) and checker flags (to end the race). These may be displayed on the touch screens 102F and/or 108B of computer control terminal 102 and/or auxiliary control terminal 108. Alternatively, they may also be displayed on score boars 104I. Score boards 104I may also be configured to display scores, race statistics, results, etc. In one aspect of an embodiment of the present invention, data regarding racing vehicle 106 (e.g. performance, location, etc.) may be picked up by sensors along racing track 104 and transmitted back to computer control terminal 102 via power rails 104C. Computer control terminal 102 then, after analyzing the data received, re-transmits the data to score boards 104I in a format that then may be displayed on score boards 104I.

Figure 5A:
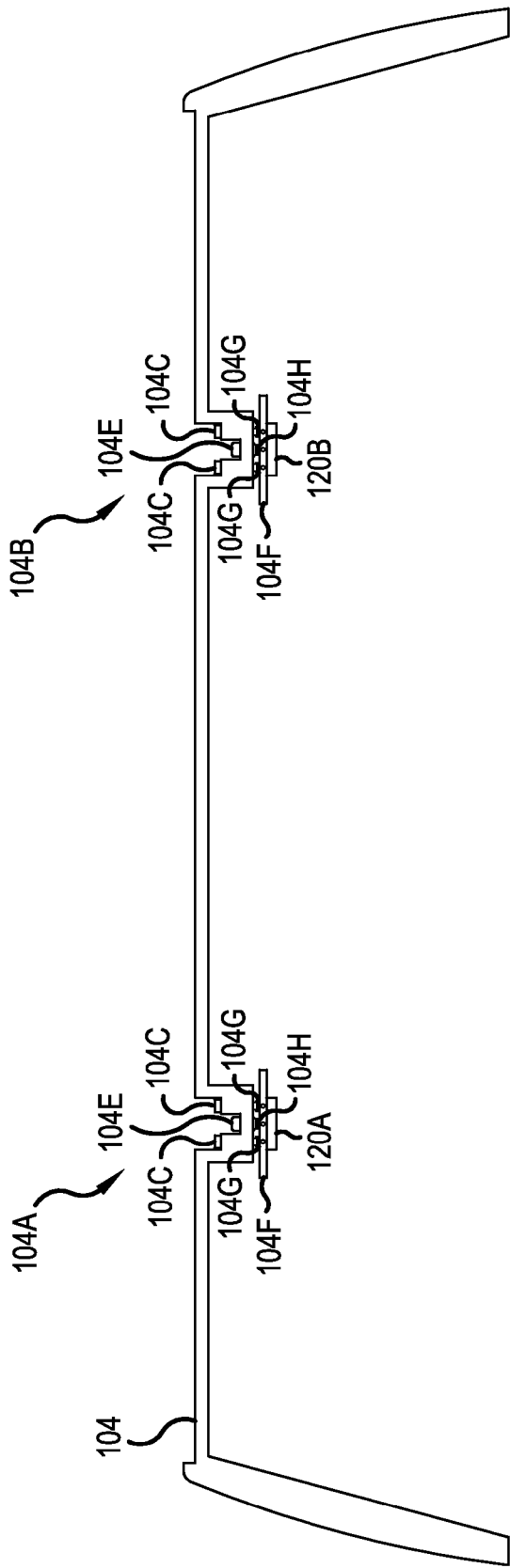
Figure 5C:
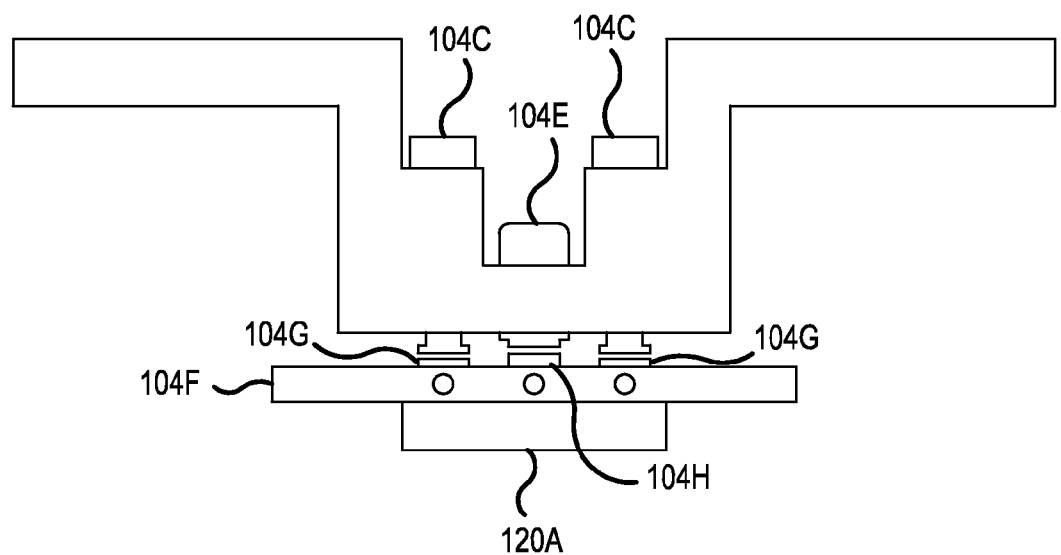
Figure 5D:
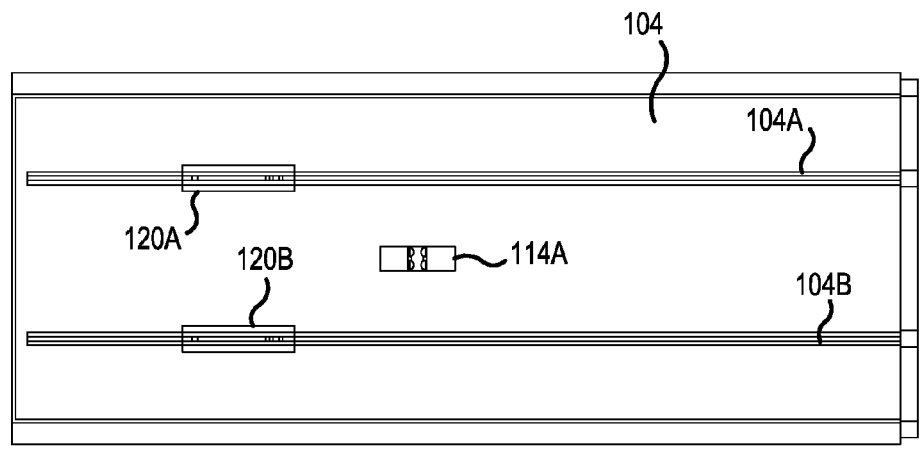
Figure 5E:
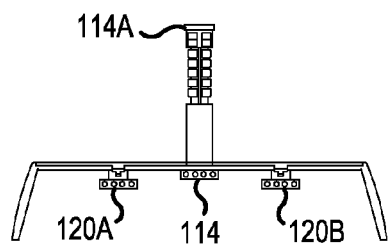
Figure 5F:
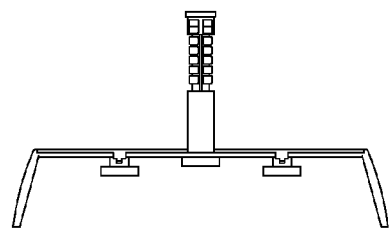
Figure 5G:
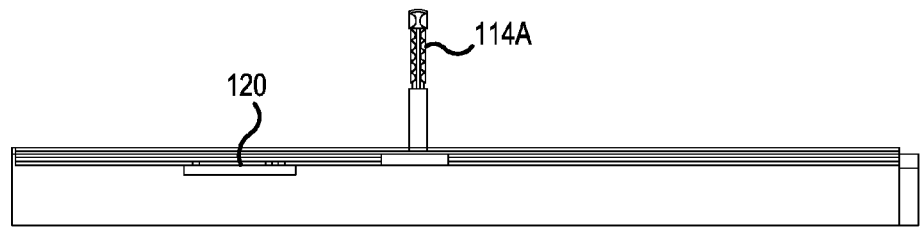
Figure 6A:
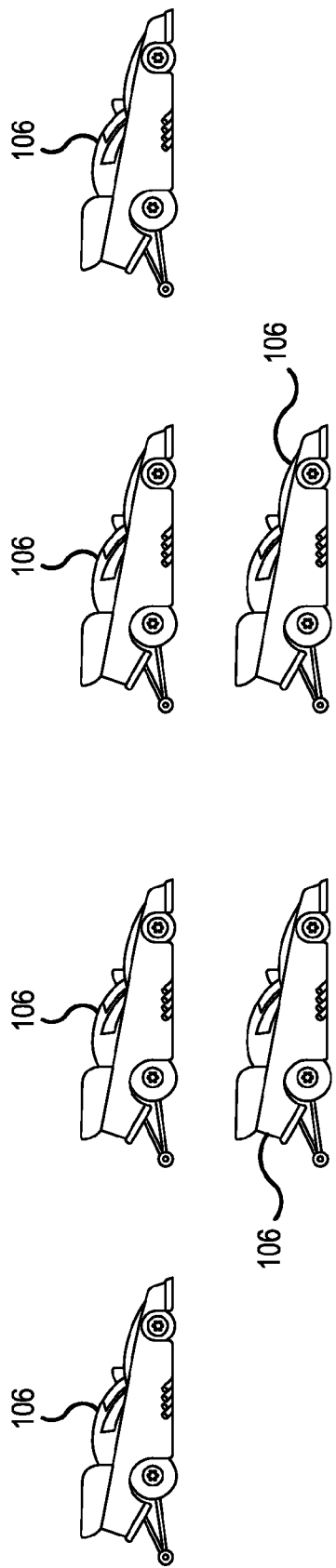
FIG. 6A through 6F illustrate different exemplary views of racing vehicles according to aspect(s) of embodiment(s) of the present invention.
Figure 6B:
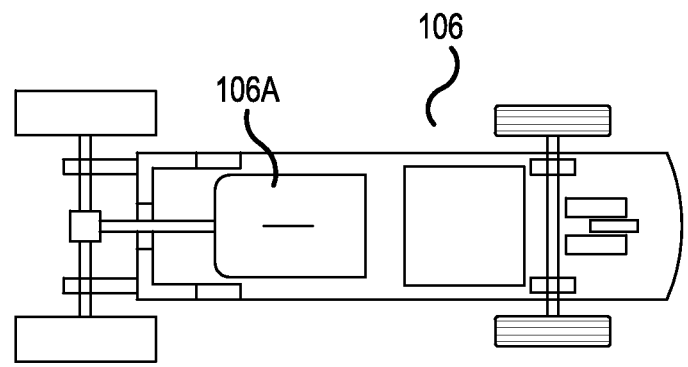
Figure 6C:
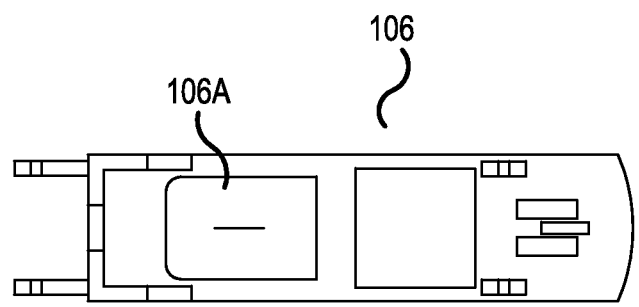
Figure 6D:
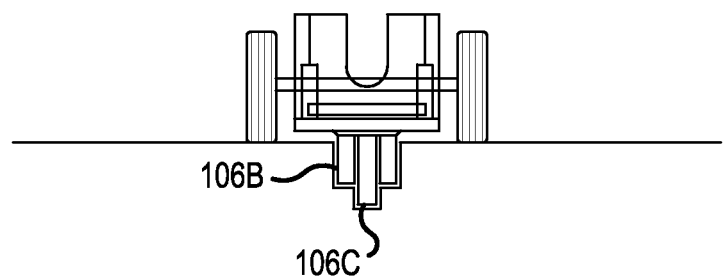
Figure 6E:
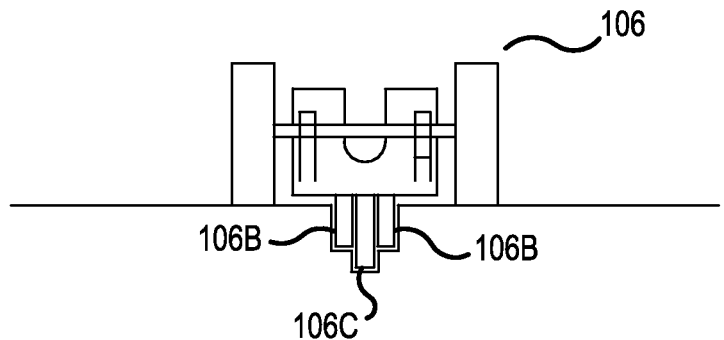
Figure 6F:
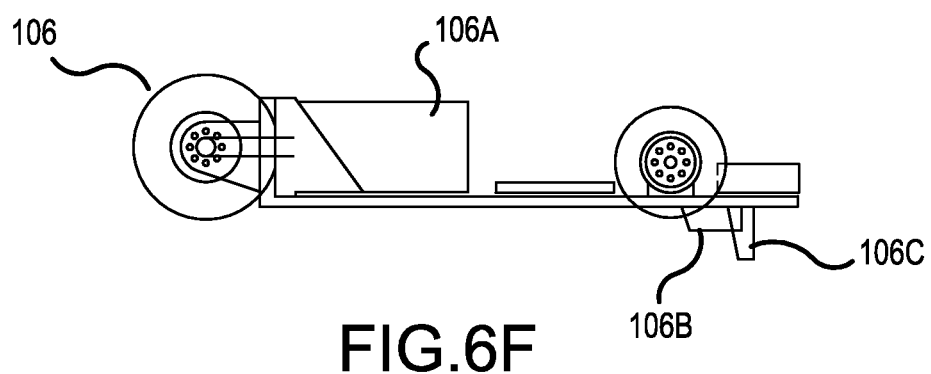

Referring now to FIGS. 5A through 5G further details of racing track 104 and racing track 104 components, according to aspects of embodiments of the present invention, are shown. For the sake of brevity, because racing track 104 includes at least two identical lanes, 104A and 104B, the features discussed here pertains to each lane respectively. In FIG. 5A, specifically, a cross-sectional view of racing track 104 is shown. In one aspect of an embodiment of the present invention, racing track 104 may be characterized by a recessed subsurface one eighth inch below the track surface and one fourth inch wide is configured into the length of the track. This configuration will allow power rails that are traditionally located in the surface of slot car tracks, to be placed below the surface, enhancing the real world look. As shown here, racing track 104 is shown with power rails 104C within racing track 104. As previously discussed above, computer control terminal 102 converts the performance codes received from auxiliary control terminal 108 into electrical impulses. Computer control terminal 102 then sends the impulses to racing track 104 via power rails 104C in order to power up and determine the performance of racing vehicles 106. Power rails 104C are connected digitally to computer control terminal 102 and operate to carry digitalized electric impulses from computer control terminal 102 to the electric motor in the cars. Power rails 104C receive and carry digitalized electrical impulses (continuous, intermittent or on-off electric signals) to racing vehicles 106's electric motor contacts. The electric motor then rotates in a continuous, intermittent or on-off manner based on the impulse(s) received, thus determining the racing vehicle 106's performance along racing track 104, which will facilitate the performance times of 3.5 to 10 seconds down the track.

The fastest time between 3.5 and 10 seconds will be a function of the racing vehicle 106's min./max. speeds as determined by the performance codes built by users into them during the car customization processes at auxiliary control terminal 108 and transmitted to racing vehicle 106 via computer control terminal 102 as electrical impulses. The components and parts that are included in the virtual cars during this process will determine their ultimate speed. The 3.5 to 10 seconds fastest time is ultimately a function of the performance coding built into the game's software.

In another aspect of an embodiment of the present invention, racing track 104 may feature a two tier recessed subsurface one eighth inch below the track surface and one fourth inch wide is configured into the oval track. The second tier may be recessed 3/32 inch below the first tier. This configuration enable power rails 104C that are traditionally located in the surface of slot car tracks, to be placed below the surface, enhancing the real world look. Sixteen (16) sensors (eight in each lane) that detect the cars' positions at key points during the race may be connected at the base of the second tier. In this configuration, racing track 104's working components may include, inter alia: sixteen (16) car position sensors, power rails and light emitting diodes (not shown) that simulates racing under the lights. These components may be digitally connected to computer control terminal 102 to control the performance of racing vehicle(s) 106 during the race, count the laps that racing vehicle(s) 106 complete, and enable race announcers to call an accurate race. The light emitting diodes ((positioned at key points around the track) will allow the simulation of night racing in a low light environment.

In another aspect of an embodiment of the present invention, racing track 104 may feature recessed sub-surfaces configured into each lane to allow power rails and sensors to be placed below the track's surface, sub-surface 1/4 inch wide and 7/32 inch deep.

In another aspect, racing track 104's working components produce data that is relayed to computer control terminal 102 via PC boards; data which is then processed by computer control terminal 102 to produce race times, race results, round eliminations, track records, race related animations and other on-screen displays.

Racing track 104 may also include staging and timing sensor 104E, printed circuit board 104F, rail to PC board connecting point 104G, timing and staging connecting point 104H and staging and timing sensor module 120.

Printed circuit board 104F functions to connect racing track 104 directly to computer control terminal 102. Printed circuit board 104F also serves as the platform for the track "modules" and their connection to computer control terminal 102. It further serves as the platform for connecting power rails 104C to computer control terminal 102.

Rail to PC board connecting point 104G, serves to conduct electric impulse signals from computer control terminal 102 to power rails 104C. It is the point where power rails 104C connects to the electric impulse circuit on the board Staging and timing sensor module 120, which operates to translate the racing vehicles 106 from the starting point back to the computer control terminal 102, connects with racing track 104 at timing and staging connecting point 104H.

Racing track 104 also includes starting system module 114, called a "Christmas tree," and staging and timing sensors that signal to computer control terminal 102 the racing vehicle 106 positions at select positions during the race. Starting system module 114 may include a staging lighting component 114A, having a number of lights, and a processor component 114B. These components, and power rails 104C in the track, are connected digitally to computer control terminal 102. Processor 114B may, in one aspect, be located within racing starting system 114's module and be configured to control the sequencing of staging lighting component 114A's lights as instructed by computer control terminal 102 to stage cars and to start the race. A portion of the module may be located on the underside of racing track 104 at the point while lighting component 114A may be positioned on the surface of the track. Lighting component 114A, in one aspect of an embodiment of the present invention, may be composed of a series of lights, in three vertical groups with each group of lights having a unique function in staging and starting the race. They include: top stage lights (two each lane), middle starting lights (three each lane), and bottom start and disqualification lights (one each lane). The lights may be digitally operated by processor 114B that may be designed to, inter alia, assist each racing vehicle 106 in moving to their respective starting positions along racing track 104, countdown to race start, start race, and disqualify cars that start before race start is signaled.

Referring now to FIG. 6A through 6F different views of racing vehicles 106 according to aspect(s) of embodiment(s) of the present invention, are shown. Racing vehicle(s) 106 may be made to look like actual racing vehicles. In one aspect of an embodiment of the present invention, they may be equipped with electric motor 106A which connects with power rails 104C of racing track 104. Connection is made possible by way of contact point 106B which transmits the electrical impulses from power rails 104C to electric motor 106A. To stage and determine the location and race time for racing vehicle 106 is racing vehicle sensor 106C which connects with staging and timing sensor 104E to relay data about racing vehicle 106 such as, without limitation: location, performance, etc. back to computer control terminal 102. The digitized electrical impulse received by electric motor 106A from power rails 104C controls the rate of revolutions of electrical motor 106A and thus its performance down racing track 104.

In one aspect of an embodiment of the present invention, the underside of racing vehicle 106 may include a component that extends into the recessed subsurface of racing track 104 to activate sensors that signal computer control terminal 102 racing vehicle 106's position at certain points on racing track 104 during a race. Computer control terminal 102 processes these signals to determine racing vehicle 106's actions, location and performance during the course of the race. After such determination(s) have been made, computer control terminal 102 then posts the race results.

Racing vehicle(s) 106, in one aspect of an embodiment of the present invention, may feature slow speed electric motors, along with axle to gearing ratios that enable racing vehicle(s) to race down racing track 104 within times anywhere between 3.5 and 10 seconds.

Figure 7:
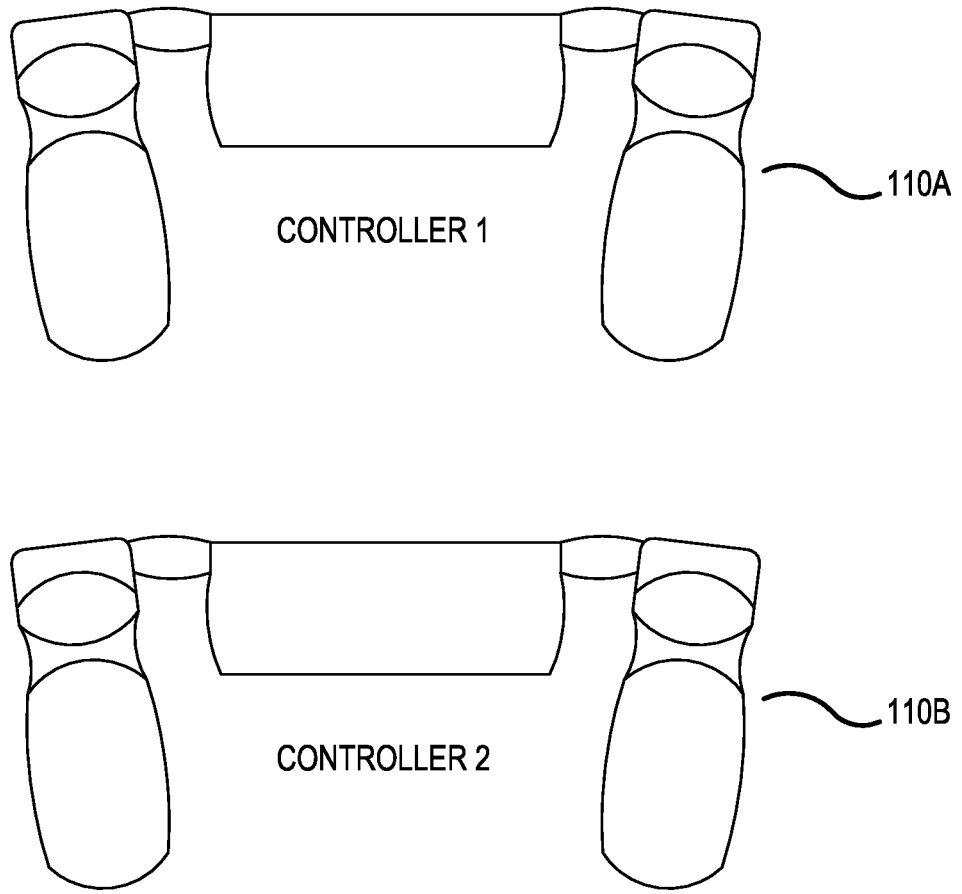
FIG. 7 illustrates exemplary plan views of vehicle controllers, according to an aspect of an embodiment of the present invention.

Referring now to FIG. 7 plan views of controllers 110A and 110B, according to an aspect of an embodiment of the present invention, are shown. Controllers 110A and 110B will be users' primary means of controlling racing vehicles 106 during pre-race actions and their race down racing track 104. System 100 may feature at least two car controllers 110A & 110B that, in one aspect of an embodiment of the present invention, may be subcomponents of computer control terminal 102. Ideally, each lane will have its own controller. Computer control terminal 102 controls the actions of the cars on the track, and the car controllers 110A & 110B interact with it to make that happen. Their connection to computer control terminal 102 may be wireless, which allows their users free mobility while using them. The interactions of controllers 110A & 110B with computer control terminal 102 enables their control of racing vehicle(s) 106 on the track during racing actions of burnouts. Controllers 110A & 110B, may in one aspect of an embodiment of the present invention, initiate burnouts while, in another aspect, computer control terminal 102 may control this action automatically. Controllers 110A & 110B may also be used to stage racing vehicle(s) 106 to race by moving them to the race start position. Car controllers 110A & 110B feature a two stage action trigger that controls, in stage one, the following actions/components of racing vehicle(s) 106: vehicle's engine, tire burnouts and staging actions. In stage two, the second stage trigger may control vehicle actions during the race down the track. In another aspect of an embodiment of the present invention, controllers 110A & 110B may be configured to have an acceleration trigger which could be used to accelerate racing vehicle(s) 106.

Racing vehicles 106 are designed to look and perform on racing track 104 like real world racing vehicles. Their performance on the track will be determined by signals sent from computer control terminal 102 to power rails in the track, as discussed above. This will make their performance fully computerized, with inputs from touch screen commands (engine starts, etc.) and the car controllers 110A & 110B.

Aspects of embodiments of the present invention also contemplate mini-stepper motors and digital controlled current in the track power rails as a method of controlling the speed of the cars with absolute precision. In other aspects, the racing vehicle(s) 106 may possess an on-board processor (not shown) for accurately transmitting the electrical impulses to the vehicle's motors for precise implementation of the performance codes. The on-board processor may also function to facilitate precision control of electric motor 106A. The on-board processor may be configured to maintain speeds to enable complete racing translation by racing vehicle 106 run-down-the-track within 3 to 10 seconds, for instance; the "run-down-the-track" being racing vehicle 106's motion from a start point to an end point on racing track 104.

Figure 8A:
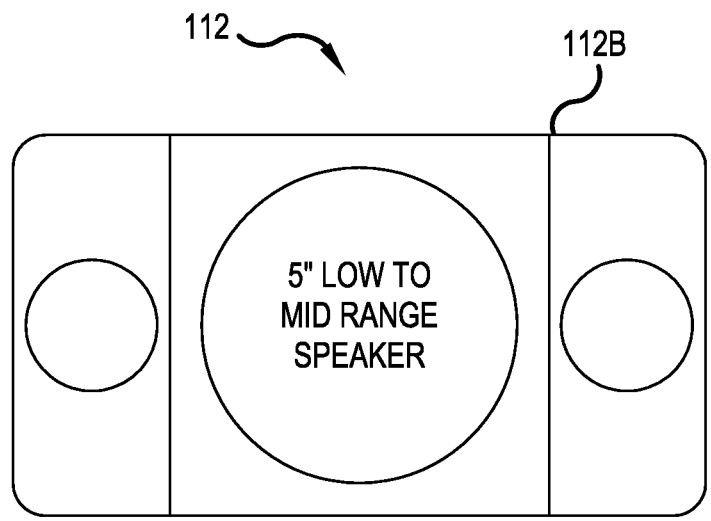
FIG. 8A illustrates an exemplary front view of a speaker unit, according to an aspect of an embodiment of the present invention.
Figure 8B:
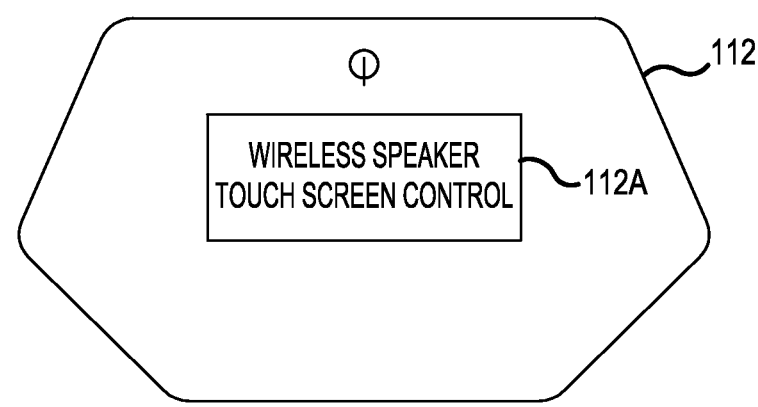
FIG. 8B illustrates an exemplary top view of a speaker unit, according to an aspect of an embodiment of the present invention.

Referring now to FIGS. 8A & 8B front and top views of speaker unit 112, according to aspect(s) of embodiment(s) of the present invention are shown. Speaker unit 112 is designed to generate the sounds of racing as heard in the real world. This component may be connected a number of ways to computer control terminal 102 including wirelessly and/or digitally. Computer control terminal 102 features a racing sound set that is transmitted to speaker unit 112. Speaker unit 112 will feature speaker components with the frequency ranges to produce the many sounds of racing, including: engine starts, engine revving, burnouts, vehicle's run-down-the-track engine sounds, race announcers, ambient sounds of actual track racing, high speed passing sound as cars passes computer control terminal 102, pit stop sounds (air wrenches, tools actions, etc.) and pit area activity such as background sounds.

System 100 features all the elements that make racing at a high level challenging to its many participants and exciting to its many fans. As a new style gaming concept, it will have the potential of introducing racing to those that have never experienced the sport. Alternatively, the race track may be curved to form a loop to simulate an alternate type of race, such as the oval track stock car racing format.

In a yet another aspect of an embodiment of the present invention, auxiliary control terminal 108 and/or car controller units 110A & 110B may interact with computer control terminal 102 to control racing vehicle(s) 106 on racing track 104 during the actions of: engine starts, revving engines, starting pace laps (computer control terminal fully controls car during pace and cautions laps), control the cars racing during green flag racing laps, selecting pit stop options (fuel, tires, etc.), burnouts, staging vehicles to race (computer control terminal 102 may assist the very slow staging action to move racing vehicle(s) 106 to race start position) and racing vehicle(s) 106's run down the track from race start to finish. With respect to burnouts, in one aspect, the operator may initiate "burnout" with his or her car controller when prompted by the computer control terminal 102. Upon initiation, computer control terminal 102 fully controls the "burnout" action as the car moves down the track. When the "burnout" is complete (a short distance down the track), computer control terminal 102 automatically reverses the car to the pre-staging position. The car operator will not have control of his or her car after the "burnout" is initiated, Car control will return to the operator when the car has fully reversed to the pre-staging position for race start.

Aspect(s) of embodiment(s) of the present invention contemplate on-screen pit stop animations when cars make pit stops. These may be displayed on the displays of system 100 including those of touch screen 102F, touch screen 108B and score boards 116A & 116B.

Aspect(s) of embodiment(s) of the present invention also contemplate virtual touch screen animations/car-on-the-track color and performance synchronizations. These synchronizations provides touch screen animations, racing sounds, and race announcements that reflect the action on the physical track.

Wireless communicator module 102E may be configured in one aspect of an embodiment of the present invention to internet updates and downloads to be made accessible to system 100 and also to effect such updates and downloads to system 100. Computer control terminal 102, in another aspect, may also include one or more USB ports to allow portable drive downloads. Users may also be enabled to select virtual racing vehicles that are online and download the performance codes associated with same to system 100.

Gaming on system 100 may include, in aspect(s) of embodiment(s) of the present invention, the ability to enable 25, 50, 75 and 100 lap races, with random number of caution (yellow flag) laps. With such lap races, digital read outs of remaining laps of racing vehicle(s) 106 may be displayed on touch screen 102F, touch screen 108B and score boards 116A & 116B. Computer control terminal 102 may maintain full control of racing vehicle(s) 106 on the track during the slow speed pace car and caution (yellow flag) laps.

Aspects of embodiments of the present invention also contemplate enabling traditional NASCAR undesirable performance of the cars into system 100 such as vehicles running hot, running loose, etc.—all of which may be incorporated into the performance codes.

The performance codes of system 100 may also contemplate code to replicate car fuel consumption as a component for the design of racing vehicle(s) 106. The performance code of system 100 may also include code for enabling the calling out of vehicles by the vehicle's number ("28 car" just passed "48 car" etc.).

All of the above interactions and actions may be made possible by computer program code processed by the processor(s) of system 100.

The invention has been described in detail with particular reference to certain preferred embodiments thereof, but it will be understood that variations and modifications can be effected within the spirit and scope of the invention.

What is claimed is:

1. A computerized car racing game system comprising:
   a computer control terminal;
   an auxiliary control terminal, in communication with computer control terminal,
   the auxiliary control terminal being configured to enable users to build computer models of real world racing vehicles, wherein the computer models are converted by the auxiliary control terminal into performance codes;
   a racing track, having left and right lanes, each lane being in communication with the computer control terminal;
   at least one racing vehicle, adapted to run along either lane of the racing track;
   at least two controllers in communication with the computer control terminal and configured to control the at least one racing vehicle; and
   a speaker unit in communication with the computer control terminal,
   wherein each of the left and right lanes of the racing track further comprise of
   power rails, for supplying power and electrical impulses from the computer control terminal to the racing track;
   at least one staging and timing sensor for staging the at least one racing vehicle for racing, starting the race and timing the at least one racing vehicle's run down the racing track; and
   at least one printed circuit board, in communication with the computer control terminal, wherein the at least one printed circuit board is configured to connect the power rails to the computer control terminal by way of at least one printed circuit board connecting point.

2. The car racing game system of claim 1, wherein the computer control terminal is configured to receive the performance codes from the auxiliary control terminal and convert the performance codes into electrical pulses sent to the racing track.

3. The car racing game system of claim 1, wherein the at least one racing vehicle comprises of a motor, contact point, and a staging & timing sensor.

4. The car racing game system of claim 1, wherein the computer control terminal comprises of:
   a processor for control, monitoring and processing of all operations of the car racing game system and for converting the performance codes received from the auxiliary control terminal into electrical pulses;
   a track speed control module which is configured to monitor and control the at least one racing vehicle's speed along each lane of the racing track;
   a staging & timing system module which is configured to monitor and control all staging and timing operations of the car racing game system;
   a wireless communicator module for enabling wireless communication between the computer control terminal and other components of the car racing game system;
   a touch screen for enabling user input into the car racing game system; and
   an input/output touch screen module for processing user input and providing output regarding the car racing game system.

5. The car racing game system of claim 1, wherein the auxiliary control terminal comprises of:
   a car performance calculator module which is configured to enable users to build the computer models of real world racing vehicles;
   a processor for control, monitoring and processing of all operations of auxiliary control terminal and for converting the built computer models into performance codes sent to the computer control terminal;
   a wireless communicator module for enabling wireless communication between the auxiliary control terminal and at least one other component of the car racing game system;
   a touch screen for enabling user input to the auxiliary control terminal; and
   an input/output touch screen module for processing user input and providing output regarding the auxiliary control terminal.

6. The car racing game system of claim 1 further comprising a race track lighting component in communication with the computer control terminal.

7. The car racing game system of claim 6, wherein the race track lighting component comprises of a set of lights configured to stage and start the race and a processor for sequencing operation of the set of lights and for facilitating communication between the race track lighting component and the computer control terminal.

8. The car racing game system of claim 1 further comprising at least one race finish sensor located along the racing track and in communication with the computer control terminal, wherein the at least one race finish sensor is configured to facilitate the computer control terminal in its functions of: pre-race actions, staging the at least one racing vehicle for racing, starting the race, and timing the at least one racing vehicle's run down the racing track.

9. The car racing game system of claim 1 further comprising at least one time & speed score board in communication with the computer control terminal, wherein the time & speed score board is configured to display racing times and speeds of the at least one racing vehicle.

10. The car racing game system of claim 1 further comprising a staging & timing module located on the racing track's underside and in communication with the computer control terminal, wherein the staging & timing module translates the at least one racing vehicle's position from a race starting point along the racing track back to the computer control terminal.

11. The car racing game system of claim 1 further comprising a race finish module located on the racing track's underside and in communication with the computer control terminal, wherein the race finish module translates the at least one racing vehicle from a race end point along the racing track back to the computer control terminal.

* * * * *